March 30, 1954

P. L. BLUM 2,673,585

TRAVELING-WORK-SUPPORT CONVERGING-SAWS APPARATUS
FOR MANUFACTURING TUB STAVES

Filed May 9, 1950

Inventor
Paul L. Blum
By Wilfred E. Lawson
Attorney

March 30, 1954 P. L. BLUM 2,673,585
TRAVELING-WORK-SUPPORT CONVERGING-SAWS APPARATUS
FOR MANUFACTURING TUB STAVES
Filed May 9, 1950 10 Sheets-Sheet 3
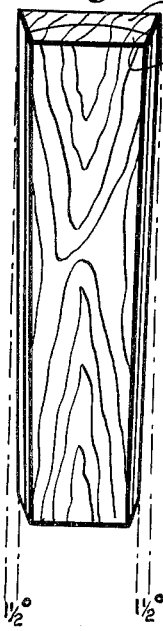
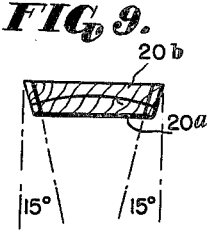
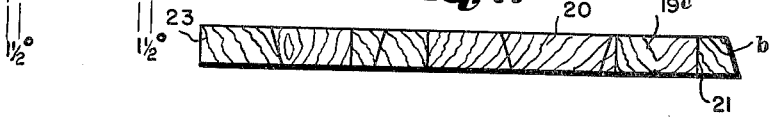
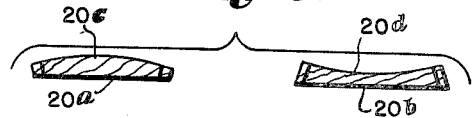
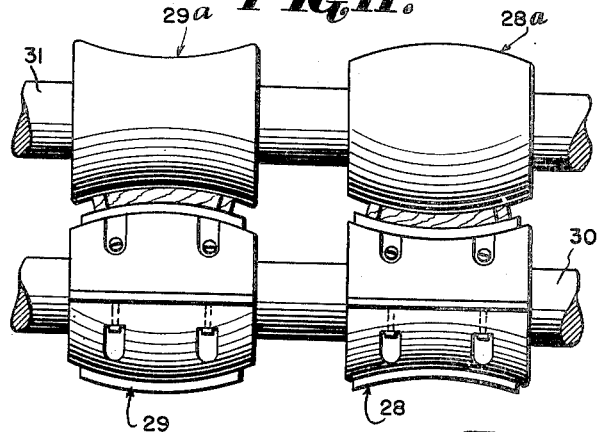
Inventor
Paul L. Blum
By Wilfred E. Lawson
Attorney

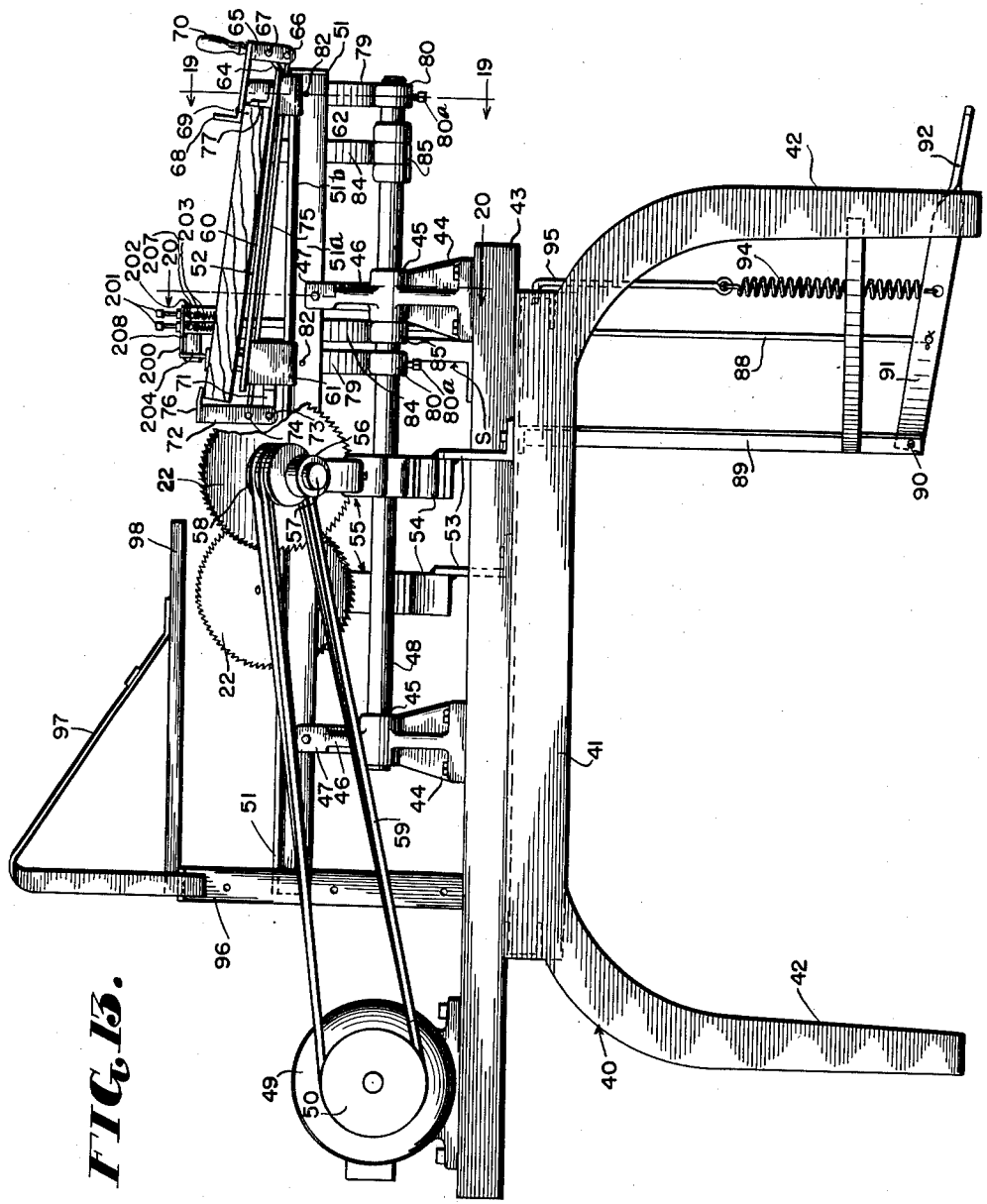
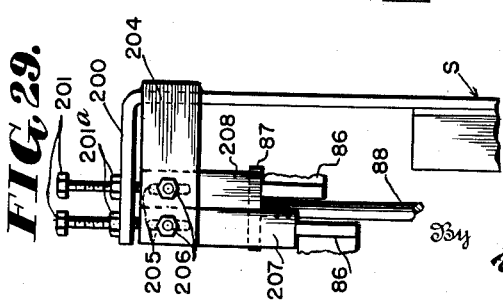

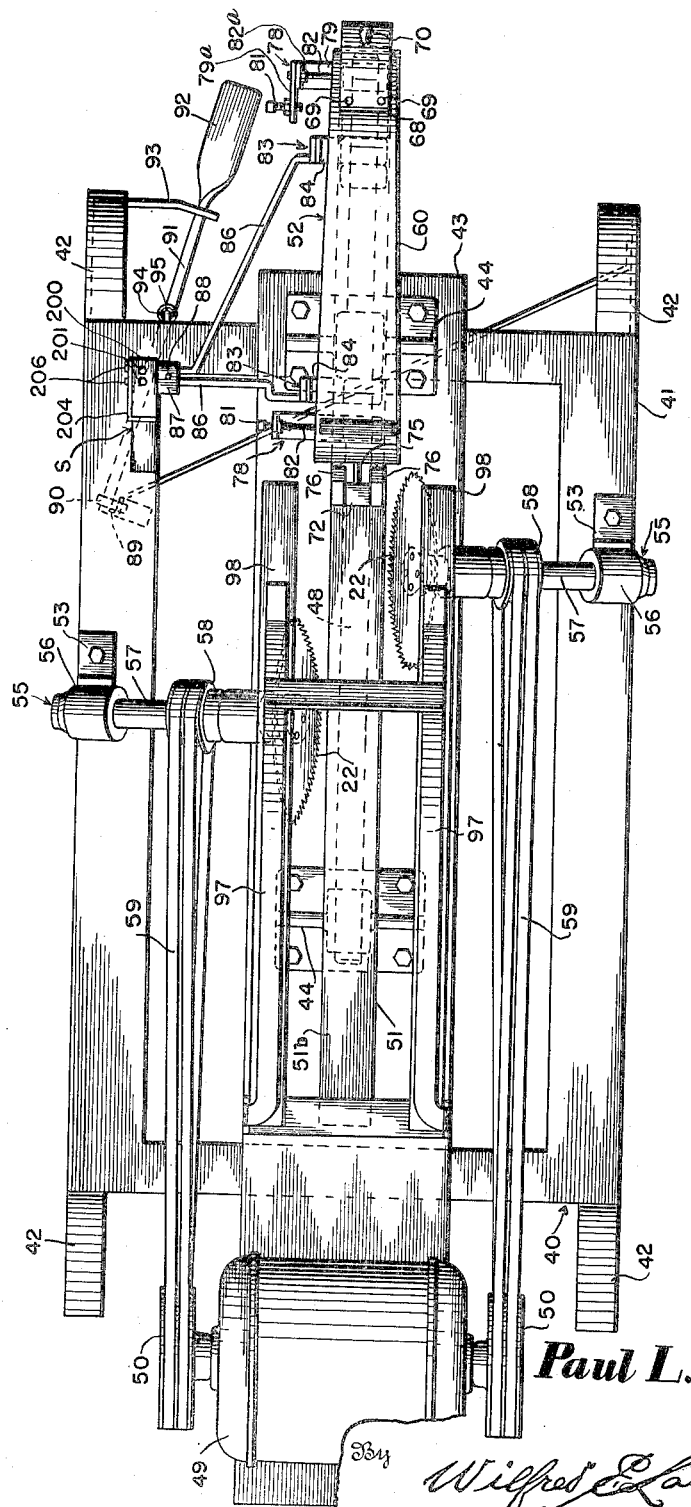

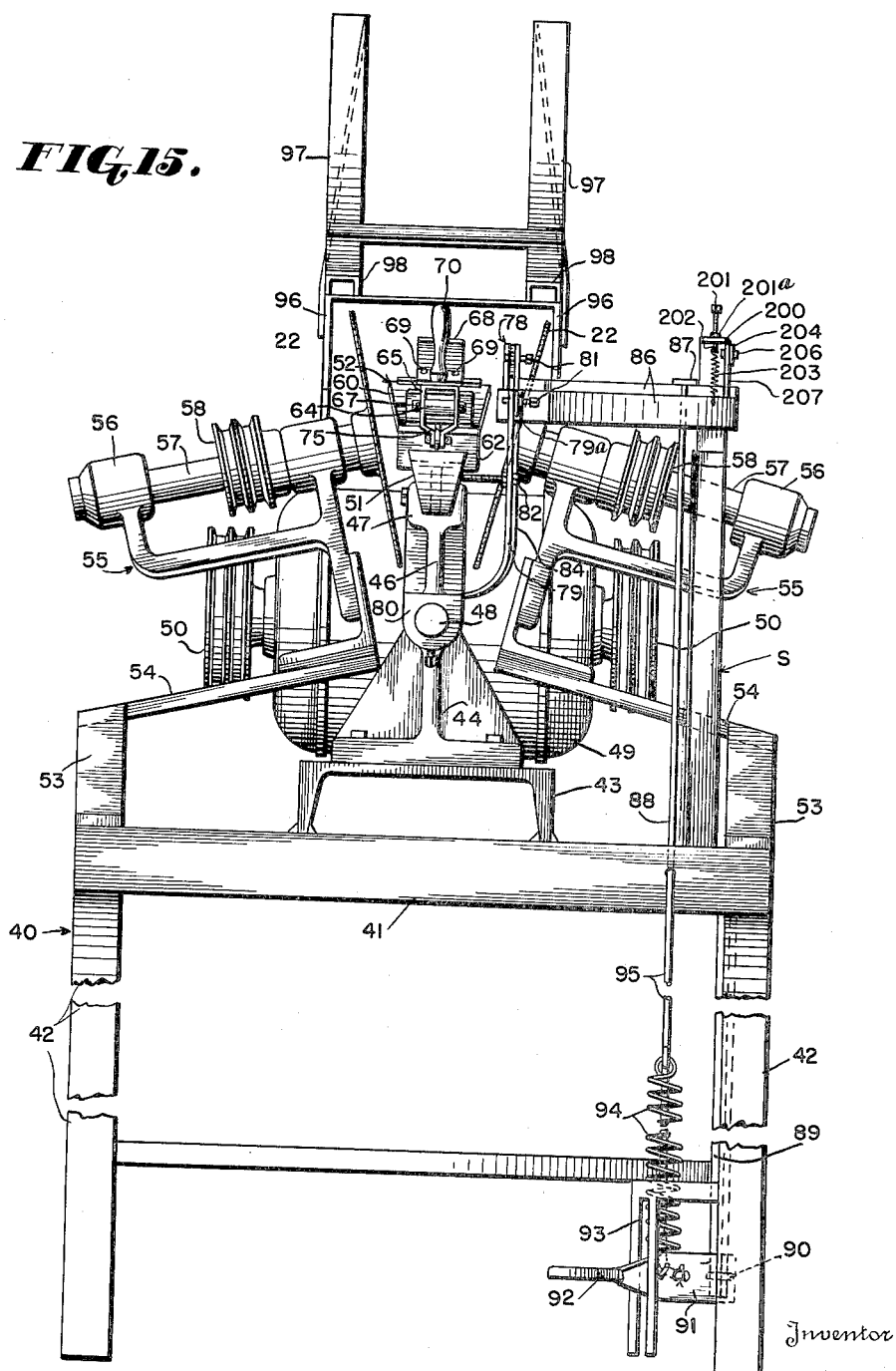

March 30, 1954   P. L. BLUM   2,673,585
TRAVELING-WORK-SUPPORT CONVERGING-SAWS APPARATUS
FOR MANUFACTURING TUB STAVES
Filed May 9, 1950   10 Sheets-Sheet 7
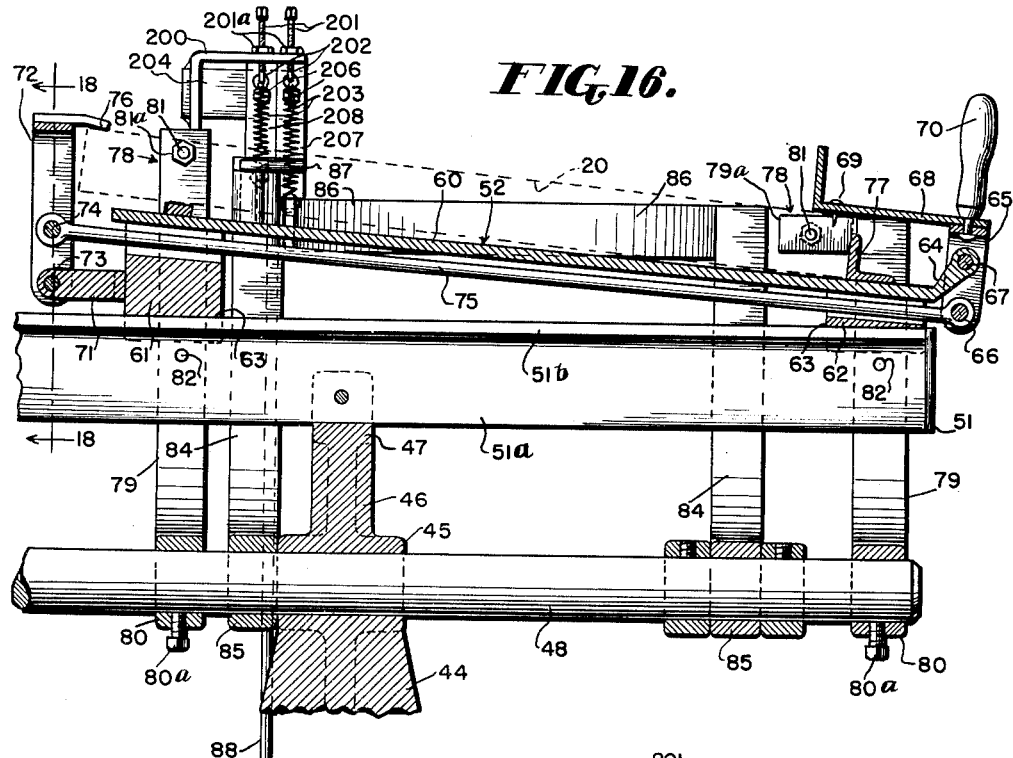
FIG. 16.
FIG. 17.   FIG. 18.
Inventor
*Paul L. Blum*
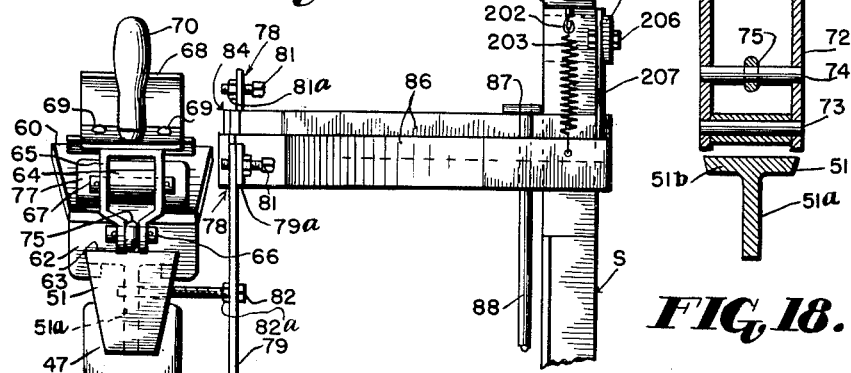
By *Wilfred E. Lawson*
Attorney

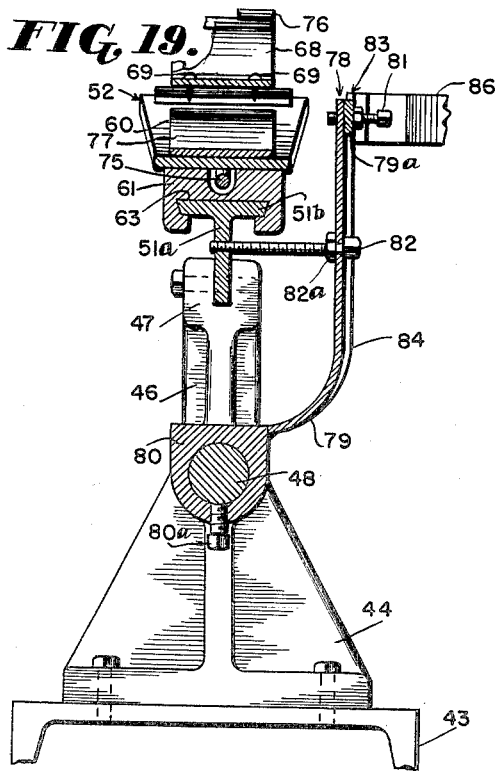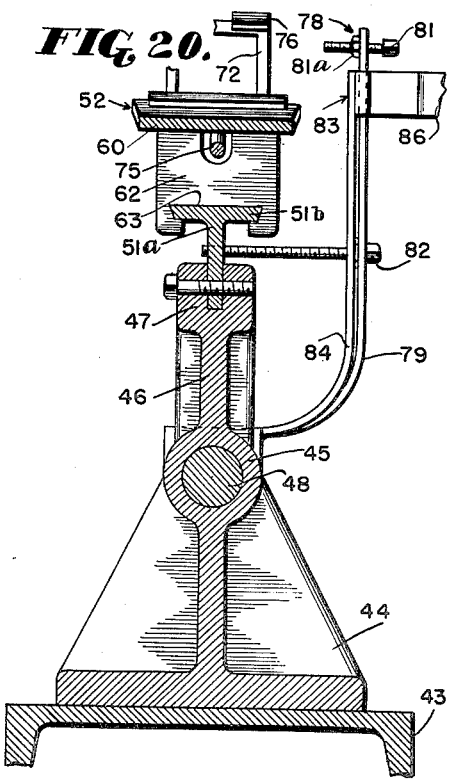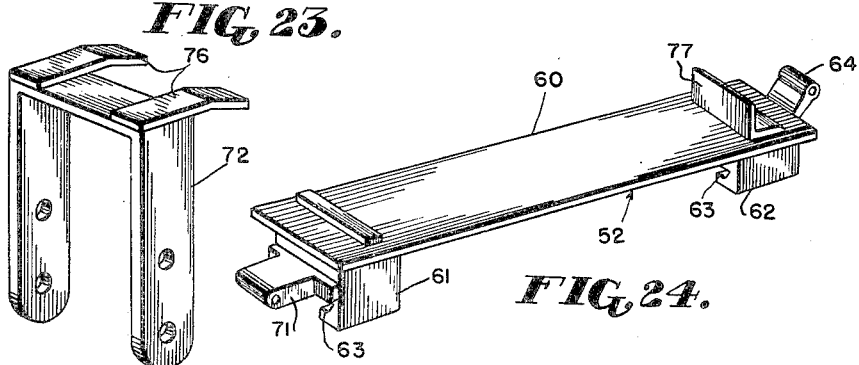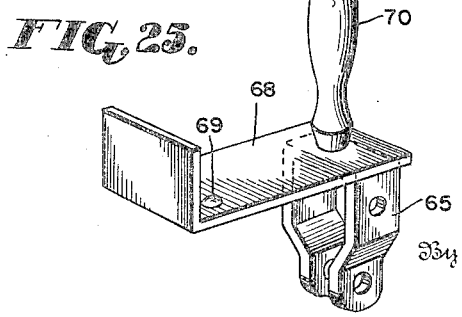

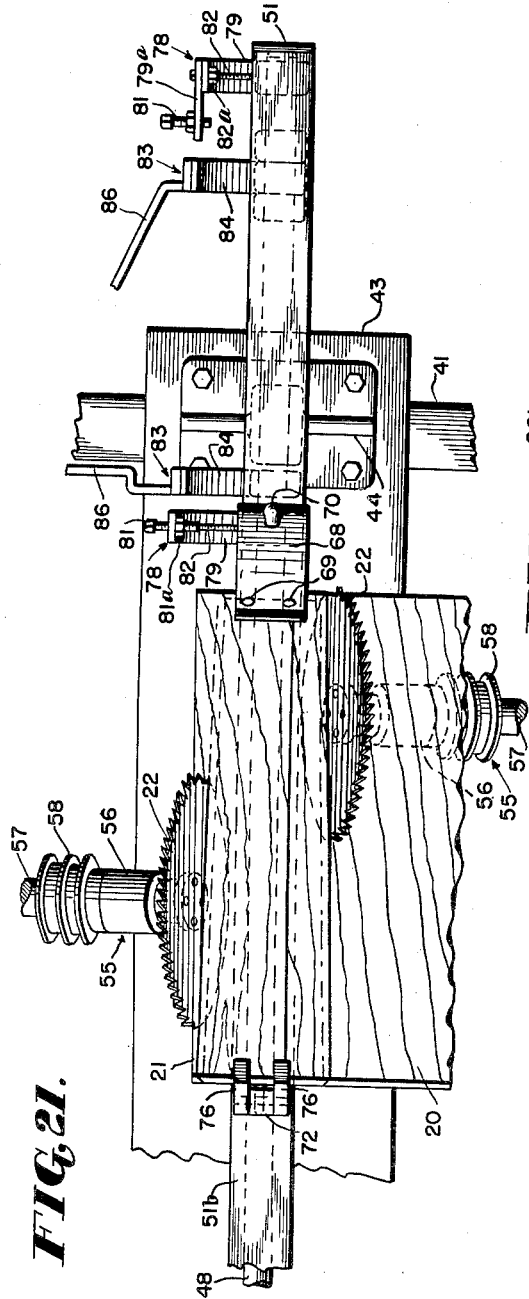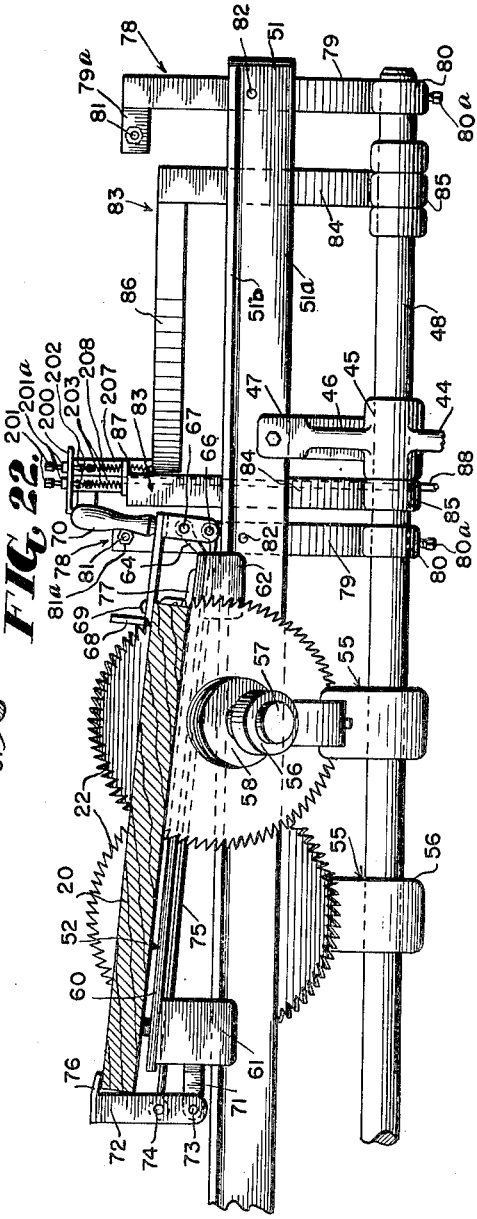

March 30, 1954 — P. L. BLUM — 2,673,585
TRAVELING-WORK-SUPPORT CONVERGING-SAWS APPARATUS
FOR MANUFACTURING TUB STAVES
Filed May 9, 1950 — 10 Sheets-Sheet 10

Inventor
*Paul L. Blum*
By *Wilfred E. Lawson*
Attorney

Patented Mar. 30, 1954

2,673,585

UNITED STATES PATENT OFFICE 2,673,585

TRAVELING-WORK-SUPPORT CONVERGING-SAWS APPARATUS FOR MANUFACTURING TUB STAVES

Paul L. Blum, Marshfield, Wis.

Application May 9, 1950, Serial No. 160,904

5 Claims. (Cl. 147—28)

This invention is directed to the art of making wooden receptacles and pertains particularly to improvements in the manufacture of tubs of tapered form such as are commonly employed in the marketing of butter, lard and other commodities.

A particular object of the present invention is to provide an improved method of producing staves of the correct taper, edge bevel and transverse curvature in an efficient manner and with greater economy than by the presently practiced methods, together with means for carrying out such method.

In the manufacture of staves for butter tubs and similar receptacles, as at present practiced, the method employed embodies a predetermined procedure of cutting the timber to produce incomplete stave pieces of arcuate cross sectional form and having unbeveled parallel longitudinal edges. After the formation of the piece in this manner, each piece is sawed to the desired taper and bevel, the result being the removal from each side of the piece of a sliver having a thickness at one end of about one-half inch, which is discarded. Thus from each stave piece there is removed waste material of the length of the piece having a thickness of about one-half inch and a width equal to the thickness of the stave piece. Where in a large tub producing factory the number of staves used in a year runs into the hundreds of thousands and probably millions, the waste material from the formation of the staves in the manner stated is considerable.

A further object of the present invention is to provide an improved method of manufacturing the tub staves whereby the sequence of operations is changed from that at present employed so that the staves are initially formed with a proper taper and bevel and the removal of waste material from the sides of the pieces is avoided, as a result of which material previously cut off and thrown away as waste now goes into the completed stave and wastage is reduced to a minimum.

Another object of the invention is to provide a novel method of manufacturing staves for tapered butter tubs and similar receptacles from material which at the present time constitutes wastage from door and window frame and sash mills, wherein such wastage comprises pieces of wood stock of from fifteen and one-half to sixteen and one-half inches in length and varying in thickness from one inch to one and five thirty-seconds inches and in width varying from two and one-half inches to five inches or more, by a novel process of joining such pieces into a preliminary blank and then taper sawing such blank on a machine of novel construction to produce an initially properly beveled and tapered piece from which two finished staves are produced.

A still further object of the invention is to provide a novel machine for sawing a blank made up in the manner above stated from a plurality of waste pieces of material, in such a manner as to simultaneously give the proper taper and side edge bevel from which two completed or finished staves are formed.

Still another object of the invention is to provide a novel sawing apparatus for forming a tapered beveled piece of the character stated, wherein a novel means is provided for automatically gripping the piece of work and holding it in proper position as the work is advanced to the saws.

A still further object of the invention is to provide in a sawing apparatus of the character set forth, a novel gauging means for use in association with a work holder and carrier whereby the piece of material is automatically positioned in the correct manner in the holder and gripped and held automatically as the carrier is shifted forwardly toward the saws so that the cut piece of material will have the proper width at its wide and narrow ends and will be given the correct taper and bevel.

Other objects and advantages of the invention will become apparent as the description of the same proceeds and the invention will be best understood from a consideration of the following detailed description taken in connection with the accompanying drawings forming a part of the specification with the understanding, however, that the invention is not to be limited to the exact details of construction shown and described since obvious modifications will occur to a person skilled in the art.

In the drawings:

Figure 6 is a view in plan of the blank as received at the former machine with a previously produced trim strip forming a part thereof, the blank further being lined to indicate the cuts for producing the stave pieces.

Figure 7 is an end edge view of the blank as shown in Figure 6.

Figure 8 is a view in perspective, looking at the inside face, of a stave piece from which two incomplete staves are formed and showing the arcuate line of cut as followed by the band saw.

Figure 9 is a view looking at the smaller end of the stave piece shown in Figure 8 and illustrating the angle of the beveled longitudinal edges thereof.

Figure 10 shows in an end view, the top incomplete stave pieces as produced from the blank shown in Figure 8.

Figure 11 is a view illustrating conventionally convex and concave planers by which the flat faces of the incomplete stave pieces are planed to a transverse arcuate contour.

Figure 12 (Sheet 1) is a view illustrating the manner of making the first cut of a blank according to one form of procedure where the blank includes in its make-up the trim strip resulting from the first cutting of the blank formed as illustrated in Figure 2.

Figure 13 (Sheet 4) is a view in side elevation of the shaper or stave piece cutting machine.

Figure 14 is a view in top plan of the shaper machine.

Figure 15 is a view of the machine as seen in front elevation.

Figure 16 is a detail longitudinal section taken centrally of the blank piece supporting carriage showing the jaws of the carriage in closed or work holding position.

Figure 17 is a view in end elevation of the carriage structure shown in Figure 16 looking at the same from the forward or front end.

Figure 18 is a transverse section taken substantially on the line 18—18 of Figure 16.

Figure 19 is a transverse section taken substantially on the line 19—19 of Figure 13.

Figure 20 is a transverse section taken substantially on the line 20—20 of Figure 13.

Figure 21 is a view in top plan of the saws and adjacent carriage structure showing the initial cutting of a blank from which a trim strip is produced which is later used in the making up of subsequent blanks.

Figure 22 is a view in side elevation of the structure as illustrated in Figure 21.

Figure 23 (Sheet 8) is a detailed perspective view of the rear jaw of the carriage structure.

Figure 24 is a view in perspective of the blank piece carrying table of the carriage.

Figure 25 is a view in perspective of the rear jaw of the carriage structure.

Figure 29 (sheet 4) is a detailed view on an enlarged scale of the movement limiting elements associated with the arms of a set of gauge stops.

Figure 1:
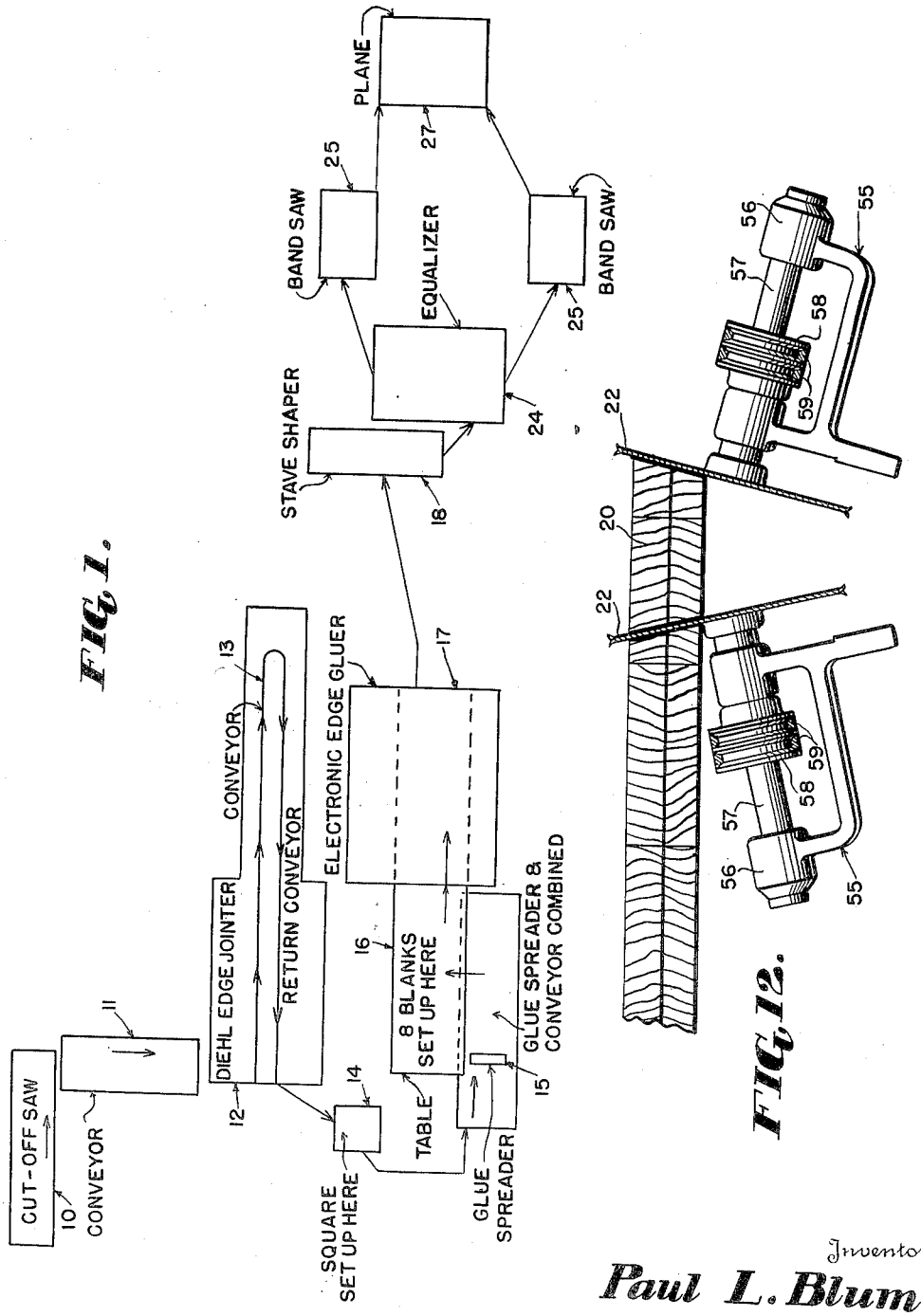
Figure 1 is a flow chart showing the different operating stations in carrying out the herein described method in the progress of the material from the stage in which it is received to the completed stave.

In setting forth the present invention the procedure or method followed will first be set forth with general reference to the various pieces of apparatus employed and reference will, accordingly, first be made to the diagram or flow chart which forms Figure 1 of the illustrations.

As hereinbefore set forth use is made of waste pieces of the material such as may be obtained from any one of numerous window and door frame or sash manufacturing mills, such waste pieces, which are of ponderosa pine, customarily running from fifteen and one-half to sixteen and one-half inches in length and having a width of from two and one-half inches to five inches or more and a thickness of from one inch to one and five thirty seconds inches.

It will, of course, be understood that the present method is not restricted to the use of the waste pieces of this particular type since longer pieces of material may be employed by reducing them to the proper lengths but the present method is of particular economic importance to the art in the fact that the usual sources of available long length material are decreasing due to the depletion of forests of the correct type of wood and the present method was accordingly devised with a view to using the material which heretofore had been useless and at the same time reducing the wastage of such material to a minimum.

In carrying out the method, where it is necessary the pieces of material are reduced to the proper thickness and the pieces are then run through a cut-off saw machine, diagramatically shown and designated 10 in the chart, where such pieces are given the proper length for the particular size tub to be constructed from the finished staves.

Standard size butter tubs holding sixty five pounds of butter measure about fourteen and seven eighths inches in diameter inside of the top and about twelve inches inside diameter at the bottom and approximately thirteen and five eighths inches deep. The finished stave for a tub of this size will be approximately fourteen and fifteen sixteenth inches long. Tubs of smaller size may, however, be made from staves produced according to the present invention, such smaller tubs being of a capacity to hold five, ten, twenty or thirty pounds of material. Accordingly further reference to specific sizes will not be made, it being understood that the method is applicable to any size desired but it will be apparent that if at the cut-off saw a piece of material is produced which is of insufficient length to make a tub of the maximum size, it may be employed for the production of staves for a smaller size receptacle.

After reducing the material to the proper length at the cut-off saw 10 it is carried by conveyor 11 to an edge jointer machine 12 where the edges of the material are shaved or planed square and true and run parallel to the grain.

After having the edges squared, the pieces of material are carried by a suitable conveyor 13 to a set-up bench 14 where they are assembled into a blank of approximately square outline and having, where the pieces are designed for use in making the maximum size tub, a length of about fifteen and a quarter inches and a width of about sixteen and one-half inches. This assemblage of pieces after being glued up will be hereinafter referred to as the blank.

The set up or assembled pieces for the blank are then transferred to the glue spreader 15 where the edges of the pieces have glue applied to them and the pieces are replaced in the previously assembled relation on a blank set up table 16. This table is of sufficient size to accommodate eight such blanks in two rows of four each and these two rows of blanks are moved one behind the other into and through a glue dryer 17 of the electronic type where the glue is set.

Preference is had for a glue dryer of the electronic type because of the rapidity with which the glue is set to full holding strength, such a condition being obtained in approximately nineteen seconds in an apparatus of this character. Such electronic glue setting devices are of standard construction and well known in the trade and accordingly it is not believed that any detailed illustration or description of the same is required in connection with the setting forth of the present method.

Following the operation of setting the glue, the blanks go to the stave shaper which in the flow chart is diagrammatically shown and designated 18. The specific construction and operation of this shaper will be hereinafter more fully set forth.

Figure 2:
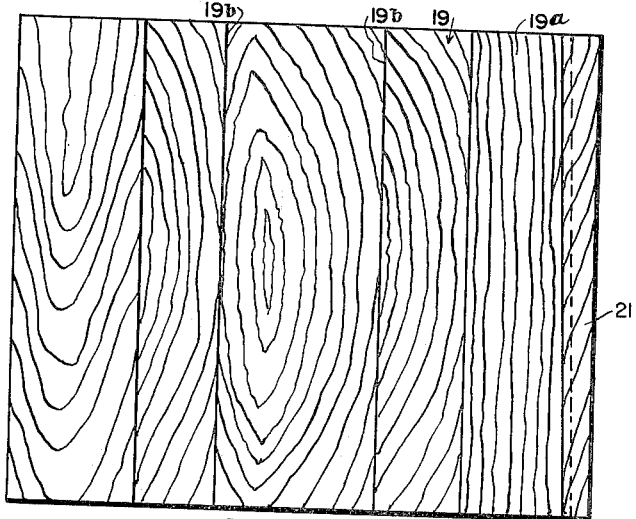
Figure 2 is a plan view of the blank as made up from the different pieces of material and showing how the first trim piece is produced in the making of the initial cut of the blank.
Figure 3:
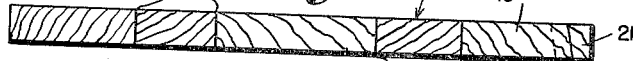
Figure 3 is an edge view of the blank as illustrated in Figure 2.

The blank as now set up ready to be operated upon by the stave shaper appears approximately as shown in Figures 2 and 3 where it is generally identified by the reference numeral 19, the individual pieces making up the blank, being designated 19a. The glued up joints between the pieces 19a are designated 19b.

The blank upon reaching the stave shaper is sawed by means of a pair of rotating circular saws constructed and arranged in a novel manner as hereinafter set forth to produce stave pieces longitudinally tapered and having side edge or longitudinal edge bevels, from each of which tapered and beveled stave pieces, two staves are subsequently produced as hereinafter set forth.

The circular saws of the stave shaper are mounted at opposite sides of a movable carriage guide to rotate on axes which converge upwardly across the top of the carriage path and the blank is fed to the saws while being held at an inclination so that the higher end of the blank is engaged first by the higher parts of the saws and the lower part of the blank passes between the convergent or toed in lower portions of the saws thereby cutting the stave piece on a taper and with its longitudinal edges beveled. The construction and operation of the sawing mechanism will be hereinafter described in more detail. In accordance with the present method, when the initially formed blank is first fed to the saws there will be produced one, two stave thick piece 20 having the proper bevel and taper, and a trim piece 21.

Figure 4:
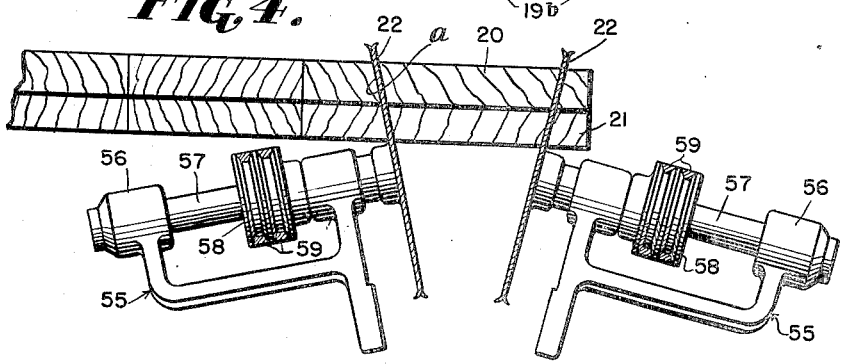
Figure 4 is a view illustrating the manner of making the first cut of the blank according to one procedure.

In Figure 4 the angular disposition of the saws, designated 22, is shown together with the trim piece 21 and the first of the tapered stave pieces 20. This view is taken looking at the low or back edge of the blank and toward the high edge. As will be readily seen in the making of this first cut on the blank, the left hand saw 22 will form or leave the right hand edge of the portion of the blank remaining after removing the piece 20, cut to the correct bevel or taper, such tapered edge being designated a.

Figure 5:
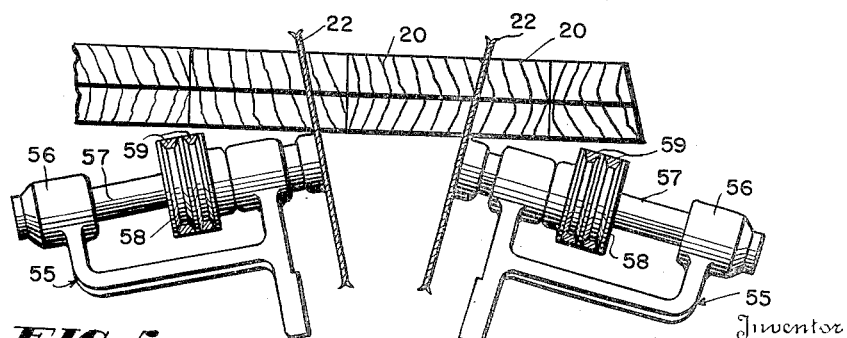
Figure 5 is a view illustrating the manner of making the second cut of the blank according to the alternative procedure which may be followed.

It will be readily seen by reference to Figure 4, and also to Figure 5, that the toe-in of the saws due to the angle of the axis of rotation or the supporting mandrils therefor, produces the correct edge bevel at each side of the blank piece and also the leading or advancing edge of the blank, engaging the saws at a higher point or elevation than the rear end or trailing edge of the blank, produces the correct longitudinal taper for the blank piece 20.

The trim piece 21 which is produced from the initially formed blanks, that is the blanks formed originally from the straight pieces 19a, is not discarded or wasted. When a number of blanks have been cut in the manner thus far described so that an equal number of these trim pieces are produced, such trim pieces are sent back to the table 16 where the eight blanks are set up as previously described. Here these trim pieces are edge glued to the squares and, as will be readily seen, the blanks thereafter coming from the electronic edge gluer to the stave shaper will have one edge correctly edge beveled and tapered. Such a blank is shown in plan in Figure 6 and in edge elevation in Figure 7. In these figures the properly beveled and tapered edge face of the applied trim piece is designated b.

Consideration will now be given to using blanks set up as shown in Figures 6 and 7, having the trim piece 21 from a preceding blank forming a part thereof and edge glued to one side as indicated at 21a, whereby such blank, here generally designated 19c goes to the stave shaper with one edge properly beveled and tapered. Two ways may now be employed for cutting the stave pieces from the blanks 19c by means of the inclined saws and by feeding the blank to the saws in the manner previously set forth.

The first of these two ways of cutting the blank would be to feed the blank to the saws, after properly setting the blank in position, with the advancing edge higher than the trailing edge as before stated, so that the already formed beveled and tapered edge b will move across the inclined face of the right hand saw and the left hand saw will cut longitudinally through the blank. In this procedure the right hand saw performs no work and a single stave piece 20 is produced. The remaining blank piece from which the single stave piece has been cut, is then turned upside down end for end and again fed forwardly to be operated upon by the single left hand saw, the right hand saw again following the right hand inclined or beveled edge face of the work. In other words each time one stave piece is sawed from the blanks, the blank is reversed or turned over end for end as stated before the next stave piece is cut off, in order to obtain the correct bevel and taper.

The second way of cutting the blank, which may be employed is to set the blank over farther to the right with respect to the saws, suitable guide stops being employed for both of these procedures, as hereinafter set forth, so that both saws now function and two stave pieces are produced or cut from the blank at a time, as illustrated in Figure 5. With this manner of proceeding it will also be apparent that the need for reversing or turning the blank is avoided, the blank merely being run through again in the same manner so as to cut two more stave pieces therefrom.

The stave piece 20, produced in either of the two ways above set forth, is shown in perspective in Figure 8 and from this tapered piece two completed or finished staves are eventually produced as hereinafter set forth.

After cutting from each blank as many stave pieces as possible, or four pieces, a remaining strip is obtained which corresponds to the original trim strip and which may be sent back to the blank assembly or set up table to be added to the blanks in the same manner as the trim strip 21, this last named or remaining strip being designated 23. Thus it will be seen that the pieces cut from the blanks in the formation of the stave pieces, namely the trim piece 21 and the remaining or tail piece 23, are not wasted but go into the making of additional blanks and give to such additional blanks an already beveled and properly tapered edge form which becomes one longitudinal side or edge of a subsequently produced stave piece.

It will be noted that in carrying out the method to the point described, after the individual pieces 19a have been cut to the proper length there is nothing removed from the blank which is discarded or wasted, except the sawdust, and the stave pieces 20 while properly tapered and beveled, have their inner and outer faces flat and parallel.

From the stave shaper, the stave pieces 20, each of which is of a thickness to have two staves produced from it, proceed to what is termed the equalizer, which is designated 24, where the staves are fed horizontally edgewise to a pair of spaced parallel saws which cut the stave piece to the proper length.

From the equalizer the properly lengthened stave pieces move to band saw machines 25 where the stave is fed or moved in an arcuate path to the vertical band saw, while being maintained vertically on its end. The stave piece is thus cut or divided longitudinally into two pieces, along an arcuate path from one longitudinal edge to the other, such cut line or line of division being shown in Figure 9 and designated 26. There are thus produced two pieces of the form shown in Figure 10, designated 20a and 20b. As shown the piece 20a has one side face transversely convex as indicated at 20c while the other piece has one side face transversely concave as indicated at 20d. Each of these pieces 20a and 20b constitutes an incomplete stave.

Completion of the staves is effected by feeding the pieces through suitable planers, the planer station being designated 27 in the flow chart and representing the last stage of the method. At the planer 27 there is provided a convex planer unit 20 which gives the convex transverse curvature to the previously flat side of the incompleted stave 20b and a concave planer which gives a transversely concave face to the previously flat side of the incomplete stave 20a.

The two planer units 28 and 29 may form a part of a single machine by having the units mounted upon a single shaft 30 which operates in conjunction with a parallel shaft 31 which carries convex and concave feed rollers 28a and 29a respectively.

The planers are here more or less conventionally shown and it will be understood that any suitable supporting means may be provided for the rotary shafts 30 and 31 and also suitable means for rotating these shafts at the desired speed.

Stave shaper or sawing machine

Figures 13 to 22 illustrate the novel sawing mechanism by which the two stave pieces 20 are cut from the blank and given the proper taper and bevel. In this connection, where the stave piece is formed for the production of staves designed to be used in a tub of the larger size the piece is given approximately a one and a half degree taper on each side from end to end and an edge angle of 15° front to back as indicated in Figures 8 and 9.

The stave shaper comprises a base structure which is generally designated 40 and which has a horizontal frame 41 and supporting legs 42 at the corners of the top which, as shown, is of rectangular form and may be constructed of suitable angle or channel iron material.

Disposed upon the top of the base frame 41, to extend longitudinally thereof, is an inverted channel beam 43, of suitable width which provides a supporting top for the machine base or table.

Mounted upon the beam 43 in spaced relation longitudinally thereof are the two upstanding brackets 44 each of which is formed to provide a horizontally disposed sleeve 45 and above this sleeve the vertically disposed post 46 which is provided with an upwardly opening slot 47.

The sleeves 45 are in alignment longitudinally of the channel beam 43 and extending through these sleeves is the solid fixed shaft 48 which at the front of the machine extends a substantial distance beyond the beam 43 as shown in Figure 13.

Upon the rear end of the channel beam 43 is mounted an electric motor 49 having the two ends of its armature shaft extending outwardly beyond the two sides thereof to receive V-belt pulleys 50.

The numeral 51 designates a fixed guide and support for a slide unit which is generally designated 52. This guide 51 is in the form of a T-beam and has the central web 51a (Figure 18) vertically disposed and secured in the slots 47 of the two posts 46, with the top or head portion 51b of the T-beam horizontally disposed as shown in Figure 13 to provide the necessary wide single guide track for the slide unit 52.

At each side of the frame 41 there is securely mounted upon a suitable upright 53, an upwardly and inwardly extending arm 54 which carries a saw arbor frame 55. This arbor frame includes in its structure the two spaced, axially aligned bearings 56 which support the saw arbor 57. See Figure 15. Each of these arbors carries the V-belt pulley 58 which is in driving connection by means of V-belts 59 with the motor shaft carried pulley 50 upon the same side of the machine.

As shown in Figure 15 the arbors 57 have their axes upwardly convergent toward the center of the machine and intersecting in a vertical plane extending longitudinally of the center of the support 51. The inner ends of these arbors, however, terminate short of this central plane and each carries upon such end the circular saw 22 hereinbefore referred to. While these saws 22 are in downwardly convergent planes the bottom edges of the saws are spaced quite far apart while the top parts of the saws are, of course, a considerably greater distance apart.

It will also be readily apparent that the spacing of the saws is such as to permit the guide 51 to be disposed therebetween and below the saw centers.

The slide unit which supports the blank from which the stave pieces 20 are cut, comprises a long plate 60 (Figure 24) which is supported adjacent its two ends, by slide blocks 61 and 62 which are provided with the dove tail slots 63 in which is received the flat top or head 51b of the guide. As shown in Figure 13 the block 61 is of materially greater height than the block 62 and this supports the plate 60 at an inclination to the horizontal top of the guide 51, the high end of the plate being directed toward the back of the machine and constituting the advancing end of the plate in the operation of moving the blank to the saws.

Means is provided for gripping and holding the stave blank in position upon the carriage plate 60, which is constructed as follows.

At the low end of the plate or front end thereof, is secured the upwardly and rearwardly directed arm 64 on which is pivotally mounted a yoke 65 (Figure 25) which is substantially in the form of an inverted U-shaped member, the side legs of which are drawn in together and connected by a pivot pin 66. The end of the bracket 64 is positioned within the yoke above the pin 66 and is pivotally secured to the side members by the transverse pivot pin 67. The top of the yoke has secured thereto the rearwardly directed flat plate 68 which constitutes a clamping jaw, being adapted to assume a horizontal position above the plate 60 over a blank placed on the plate. See Figure 16. This jaw plate carries a downwardly directed spur 69 which engages in the top of the blank when the jaw is in operative position.

Secured to the top of the yoke 65 and extending upwardly therefrom, is a handle 70 which is grasped by the operator of the machine to oscillate the yoke to raise and lower the jaw 68.

At the back or rear end of the slide unit, the block 61 carries the rearwardly projecting arm 71. This arm is disposed between the lower ends of vertically arranged side portions of an inverted substantially U-shaped yoke 72 (Figure 23) to which it is pivotally connected by the horizontal, transversely directed pivot pin 73.

Above the pin 73 the yoke has supported between its sides the second pivot pin 74 and this pin pivotally couples in the yoke the rear end of a link member 75 which extends forwardly to and has its other end pivotally mounted upon the pin 66. See Figures 16 and 18.

Upon the top of the yoke 72 is a forwardly and downwardly inclined jaw member 76 which overlies the rear high end of the plate 60 and is adapted to engage the top of the blank 20 when the latter is placed in position on the slide unit plate.

The plate 60 carries at its forward end, upon the top thereof, the upstanding blank positioning flange 77. This flange serves to assist the operator of the machine in the placing of the blank in proper position on the slide plate.

It will be seen from the foregoing that when the lever 70 is swung forwardly away from the plate the jaw 68 will be elevated and the link 75 will be shifted to oscillate the yoke 72 and correspondingly elevate the rear jaw 76. This permits the blank 20 to be conveniently placed in position and when the lever 70 is then pushed back for the purpose of sliding the unit rearwardly to move the blank against the saws, the jaws 68 and 76 will be lowered into clamping position on the blank. The harder the operator pushes on the lever 70 the more firmly the jaws will be forced into gripping engagement with the blank and at the same time the spur 69 will be thrust into the top of the blank, thus holding it against shifting on the carriage.

Figure 22 shows the hold down jaws 68 and 76 clamping the stave blank to the carriage supporting plate 60, and Figures 23 to 25 show these hold down jaws in detail together with the carriage plate.

In order to properly position the stave blank in the carriage, suitable stops are provided at the right hand side of the carriage, as follows.

The two stops of one pair are designated 78. See Figures 19, 20 and 21. These gauge stops comprise the two arms 79 each of which has a collar 80 upon its lower end, which is mounted upon the shaft 48 and adjustably secured thereto by the set screw 80a. As is clearly shown in Figure 19 each arm 79 is off-set from or disposed to the right of the carriage plate 60 and extends vertically to an elevation above the plate. The forward arm 79 carries a short rearwardly directed plate 79a and this plate, and the upper end of the rear arm 79, has threaded horizontally therethrough the adjustable positioning screw 81 which has the proper elevation with respect to the plate 60 to contact the side edge of a blank when the latter is placed on the plate. A rough adjustment of these screws 81 relatively to the plate 60, is effected by the adjustment bolt 82, carried by each arm 79, which bolt extends in toward and is threaded through the vertical web portion of the support 51. The head of each bolt 82 bears against the outer side of its arm 79 and upon the inner side of the arm the bolt carries a lock nut 82a. By backing off the lock nut 82a and loosening the set screw 80a, the arms 79 may be rocked in or out by turning the bolts, after which the nuts 82a and screws 80a may be reset. For finer adjustment of the screws 81, the jam nuts 81a may be backed off from the adjacent arm 79 to permit the turning of the screw 81 and then retightened to secure the setting.

In addition to the gauge stops 78 there is provided a second pair of gauge stops designated 83. See Figure 22. These latter stops are supported for adjustment relative to the carriage plate 60 by the actuation of a foot lever, hereinafter described.

The foot treadle operated gauge stops comprise the two vertical stop bars 84, each of which is pivotally supported upon the shaft 48 by a collar 85 upon its lower end. Each bar 84 is disposed vertically at the right hand side of the plate 60 in the same manner as the arms 79 for the first mentioned gauge stops, and each vertical gauge stop bar 84 carries a laterally extending arm 86, these arms being brought into close spaced parallel relation at their free outer ends as shown in Figure 14, where they have disposed across them the pull plate 87 to which is attached one end of a depending or hanging pull rod 88. See Figure 15.

The top of the stand 40 has secured thereto, rearwardly of the rod 88, the fixed hanging support 89, to the lower end of which is attached by the horizontal pivot 90, an end of a foot lever 91, the other end of which is turned to provide the treadle 92 which projects forwardly of the machine at the right hand side and the forward end of this lever, adjacent to the treadle 92 is positioned in a suitable forked guide 93 to prevent lateral movement.

As shown the lower end of the rod 88 is attached to the lever 91 and forwardly of the rod 88 the lever has attached thereto one end of a pull spring 94, the other end of which is connected in a suitable manner as, for example, by the link bar 95, to an adjacent overlying part of the frame. See Figure 13.

As will be readily apparent the spring 94 constantly pulls upwardly upon the treadle or foot lever 91 thus elevating the rod 88 and the plate 87 mounted upon its upper end.

Attached to the upper part of the frame 40 adjacent to the rod 88, is a standard S, Figure 29, the upper end of which supports a horizontal plate 200 which is disposed across and overlies the free ends of the arms 86. This plate 200 has two tapped holes in which are threaded the vertical screws 201, each of which is held in adjusted position by a jam nut 201*a* and each of these screws lies directly above an arm 86 and has upon its lower end a hook 202 to which is attached an end of a pull spring 203. Each of the springs 203 is attached at its lower end to an arm 86 as is clearly shown in Figures 16 and 17 and these springs constantly impose an upward pull upon the arms 86 as will be apparent.

At the upper end of the standard S there is secured just below the plate 200, a horizontal arm 204 which has a substantial width which is vertically disposed and this arm overlies the free ends of the arms 86 as shown in Figure 17. The arm 204 has formed therein two vertical slots 205 through each of which extends a bolt 206.

Disposed vertically across the arm 204 are the two stop fingers 207 and 208 and each of these has a suitable aperture, not shown, to receive a securing bolt 206. Each of the fingers 207—208 overlies an end of an arm 86 and is engaged at its lower edge by such arm to limit the upward movement of the latter under the pull of a spring 203.

By adjusting the stop members 207—208 vertically, the stopping or gauging point of the inner faces of the arms 86 is determined in order to obtain the correct width of sawed stave piece.

As is clearly shown in Figure 29 the stop 208 has its lower end at a slight elevation above the lower end of the stop 207, the plate 87 engaging only the upper one of the arms 86. This is the normal gauging position of these arms, due to the varying width of stave from one end to the other and the position of the blank on the table or carriage plate 60.

At the rear of the stave shaper machine there is positioned upon the channel beam 43, the upstanding transverse frame 96 and this frame carries the two long forwardly and downwardly inclined supporting arms 97 which at their forward or front ends are attached to and support the long guard members 98, the rear ends of which guard members are secured to the top of the frame 96 as shown in Figures 13 to 15. Each of these horizontal guard members 98 has its forward end disposed above the edge of a saw 22 and functions to protect the operator from injury while at the same time allowing the stave blank to slide rearwardly as it is sawed into the stave pieces.

*Stave shaper operation*

Having thus described the construction of the stave shaper machine its operation will now be set forth.

It will be noted upon reference to Figures 14 and 15 that the gauge stops 83 are under normal conditions, that is when the foot treadle 92 is not depressed, nearer to the center line of the plate 60 than are the gauge stops 78. If the operator depresses the foot treadle 92 he causes the stops 83 to be shifted outwardly or to the right of the machine, beyond the gauge stops 78.

If the operator is starting with a complete blank made up of original pieces 19 as shown in Figure 2, as the blank comes from the glueing machine, he first depresses the foot treadle 92, to move the stops outwardly, to the right, beyond the gauge stop screws 81, as they are shown in Figure 14, and then places the blank on the saw carriage top 60 so that the right hand edge butts against the screws 81 of the gauge stops 78. He then clamps the blank in place by shoving forwardly and downwardly upon the lever 70 thus causing the jaw 68 to swing down upon the top of the blank and the jaw 76 to swing forwardly and downwardly upon the top of the rearward end of the blank. At the same time the carriage is pushed rearwardly by the operator thus feeding the blank in its inclined position to the edges of the revolving saws 22. When the blank is passed through the saws there will be produced one two-stave-thick stave piece 20 as illustrated in Figure 4 which will be properly sawed to the desired bevel and taper, and there will also be produced a trim piece 21 which, in the formation of staves of the maximum size, will be approximately one and one-quarter inches wide at its widest end. The left hand saw 22, seen in Figure 4, thus leaves the remaining part of the original blank, that is, the part left after removing the stave piece 20 and trim piece 21, with the edge *a* cut to the correct bevel and taper.

A particular feature of the present invention in a machine of this character resides in the disposition of the saw mandrels at an angle so that the saws will toe in and produce the correct edge bevel. Also the leading edge of the blank engages the saws at a higher elevation than does the rear end of the blank thereby producing the correct longitudinal taper for the stave piece 20.

As previously set forth the stave piece 20 will have produced from it two complete staves of proper transverse curvature, taper and longitudinal edge bevel for final assembly into a tub or pail. As previously set forth the trim piece 21 which has one edge properly beveled and the other edge straight or square with the top and bottom surfaces, goes back to the blank assembly table and forms the outer side piece of another blank, as illustrated in Figures 6 and 7 so that when this blank comes to the stave shaper machine it will have one side already cut to the proper taper and bevel. This is another important feature of the present invention in providing for economy in the raw material since initial trim pieces are not discarded but go into the making of subsequent blanks and, because of the fact that such subsequent blanks come to the stave shaper machine with an edge already cut and beveled, a saving in time is effected in producing the desired stave pieces from such blank.

Considering now the using of blanks having one edge already tapered and beveled correctly as they reach the stave shaper two procedures may be employed for cutting the blank into the individual stave pieces.

First, the foot treadle is left untouched and the blank is placed in position upon the carriage plate 60 with the beveled edge engaging against the gauge stops 83. The lever or handle 70 is then thrust forwardly and downwardly so as to grip the blank between the jaws 68 and 76 and the blank is moved rearwardly toward the saws. As will be seen upon reference to Figure 12 the right hand saw 22 will follow the already formed beveled edge at the right side of the blank while the left hand saw will cut through the blank thus producing a single two-stave piece 20. Following the cutting of this single stave piece, the blank is turned over end for end and run through again in the same manner thus producing a second stave piece. Each time one stave piece is produced the blank is turned over end for end as stated and run through again. By this procedure one stave piece at a time is cut each time the blank is run through.

In the second procedure the gauge stops 78 are set over farther to the right from the center line of the carriage plate and the treadle operated stops 83 are also set over to the right and held in position by means of the foot treadle. The lateral setting of the stops 83 is such that when the blank is run through with the beveled edge thereof having previously been placed against the stops 83, two stave pieces will be cut from the blank as shown in Figure 5. In following this second procedure the blank is positioned so that the narrower end of the right hand stave piece 20 is directed toward the rear of the machine. After the cut is completed, forming the two stave pieces 20, the blank is shifted over to the right without being reversed or turned over as in the first procedure, and the process repeated to again produce two stave pieces.

Figure 26:
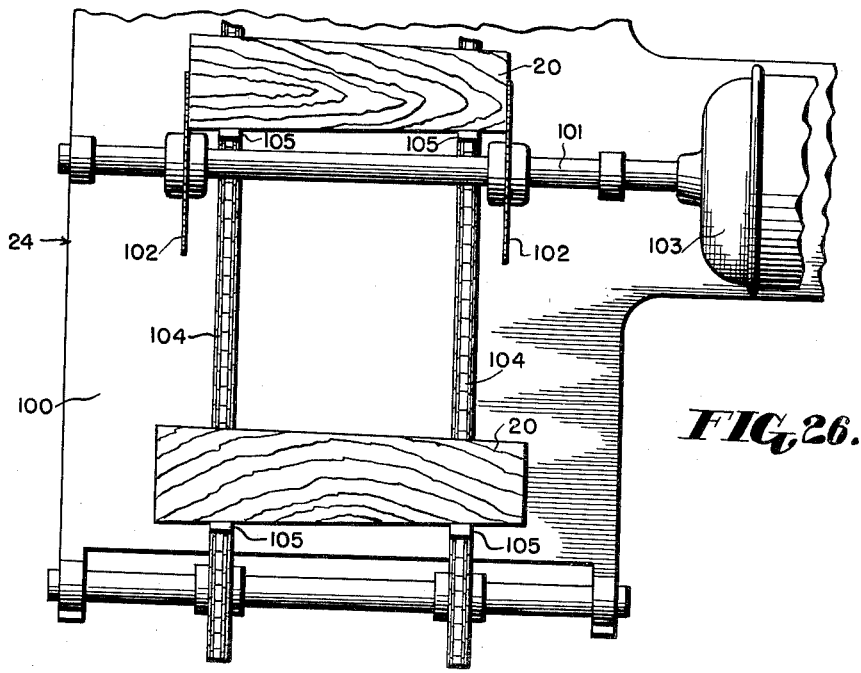
Figure 26 (Sheet 10) is a view in top plan of a conventionally illustrated sawing apparatus by which the stave pieces are cut to proper length.

After the stave pieces have been produced in the manner stated they are cut to length by a suitable mechanism such as that diagrammatically illustrated in Figure 26 which mechanism, in its preferred form, comprises a table 100 across which is disposed a shaft 101 carrying two parallel circular saws 102. These saws may be driven in any suitable manner as, for example, by a motor 103 connected with the shaft 101.

Running lengthwise of the table are endless chains 104 carrying lugs 105 which are properly positioned transversely of the table so that when they are in engagement with the inclined edge of a stave piece, such piece will be moved into the saws so as to have its ends cut off square.

Following the squaring of the ends of the stave pieces, the pieces are divided along the arcuate line 26 as shown in Figure 9 by means of a special band saw mechanism forming the subject matter of a separate application, Serial No. 160,905, filed May 9, 1950.

Figure 28:
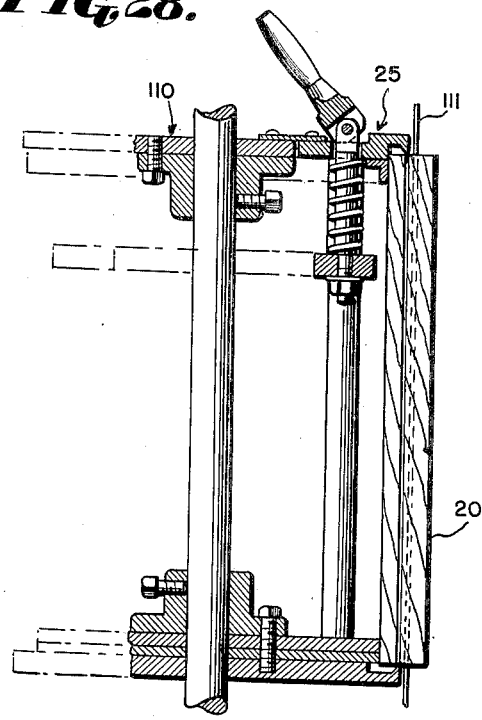
Figure 28 is a view in vertical section of a portion of the blank piece holding machine as set forth in Figure 27.
Figure 27:
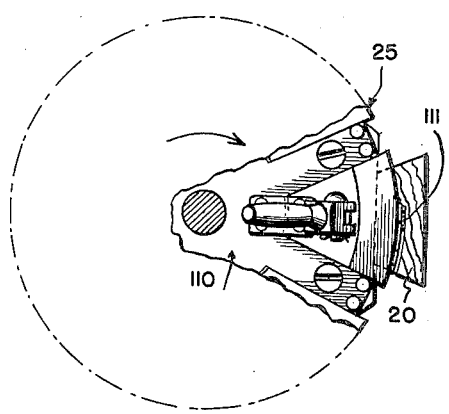
Figure 27 is a view in top plan of mechanism for holding the stave piece as it is fed to a band saw.

Such band saw mechanism broadly comprises an upright cylindrical structure diagrammatically shown and generally designated 110, Figures 27 and 28 having means at its top and bottom for securing a two-stave piece 20 in vertical position whereby, when the cylinder is rotated such stave piece will be moved edgewise to a band saw 111 which enters at one beveled edge and cuts an arcuate path through the piece 20 to the opposite beveled edge, the convex side of the arc followed by the saw being toward the wider or outer face of the stave piece. Thus there are produced the two incomplete staves 20a and 20b shown in Figure 10.

The procedure followed after the formation of the two incomplete staves by the operation of the band saw has been previously set forth, namely, the running of the incomplete staves through a planer such as that conventionally illustrated in Figure 11 and which comprises a cutter head carrying convex blades in cooperation with a concave feed roller and a second cutter head on the same shaft as the first and carrying concave cutter blades which cooperate with a convex feed roller. This final operation cuts away the flat faces of the two incomplete staves so as to bring the completed staves to transverse arcuate form and to one thickness, in which condition they are then ready to be assembled to form the completed tub or pail.

From the foregoing it will be readily apparent that there is provided by the present invention a new and novel means of forming tub and pail staves and a novel method by which a great economy can be effected in the manufacture of such articles by the use of material which has heretofore been wasted. Also according to the present method the reclaimed scrap material is assembled and sawed in a novel manner whereby considerable economy is effected through the integration into the set up blanks of initial trim pieces which become a part of the finished stave piece and the resulting staves produced therefrom.

I claim:

1. Sawing apparatus of the character set forth comprising a pair of spaced vertical brackets, a shaft horizontally supported between the same, a post extending vertically from each bracket above the shaft, an elongate horizontal member secured to the top ends of said posts, a work carriage comprising two blocks slidably supported on said horizontal member and an elongate plate supported at its ends on said blocks and at an upward inclination in the direction of movement of the carriage, a pair of circular saws disposed at opposite sides of said horizontal member in advance of one end thereof and in downwardly convergent relation, said saws being spaced for passage of the carriage therebetween, relatively movable clamp means at the forward and rear ends of the carriage plate for securing the ends of a piece of work thereon, a pair of arms mounted on said shaft at the said one end of said horizontal member and extending laterally and upwardly therefrom to an elevation above the carriage plate, a gauge stop member carried upon the upper end of each arm for adjustment in a direction transversely of the path of movement of the carriage, said stop members being at different elevations for engagement by an edge of a piece of work on the carriage plate when the carriage is in fully retracted position away from the saws.

2. The invention according to claim 1, wherein the mounting for each of said arms on the shaft comprises a collar integral with the arm and encircling the shaft for turning movement thereon whereby the gauge stop carrying ends may be moved relative to the carriage, and means for locking the collar to the shaft.

3. Sawing apparatus of the character set forth comprising a pair of spaced vertical brackets, a shaft horizontally supported between the same, a post extending vertically from each bracket above the shaft, an elongate horizontal member secured to the top ends of said posts, an elongate work carriage supported on said horizontal member for sliding movement longitudinally thereon, said carriage including a plate disposed at an upward inclination in the direction of movement of the carriage, a pair of circular saws disposed at opposite sides of said horizontal member in advance of one end thereof and in downwardly convergent relation, said saws being spaced for passage of the carriage therebetween, relatively movable clamp means at the forward and rear ends of the carriage plate for securing the ends of a piece of work thereon, a pair of arms mounted in spaced relation on said shaft for turning movement and extending laterally and upwardly therefrom to an elevation above the carriage plate to function as gauge stop members, the upper ends of said arms being at different elevations for engagement by an edge of a piece of work on the carriage plate, a pair of horizontal arms each carried by one of the first arms, said pair of arms extending laterally in convergent relation and terminating in end portions having spaced relation, spring means engaging said end portions and urging turning movement of the first arms on the shaft toward the carriage, and pedal means connected with the horizontal arms for turning the first arms against the action of said spring means.

4. The invention according to claim 3, with vertically adjustable stops overlying the said end portions of the horizontal arms for limiting the upward movement of the latter under the action of said spring means whereby to limit the turning movement of the first arms toward the carriage plate.

5. Sawing apparatus of the character set forth comprising a supporting structure, a long guide member thereon, a work supporting carriage comprising a pair of blocks slidably mounted on the guide member and a long table supported on the blocks, said table being supported with its rear end higher than its forward end, a pair of circular saws, means rotatably supporting the saws in spaced relation and in downwardly converging planes in position relative to said guide member to have said carriage slide therebetween, means for rotating the saws, means at the front and rear ends of the table for securing thereon a piece of work to be run into the saws, a hand grip carried by the table at the forward end thereof, a pair of work limit stops disposed at one side of the table and spaced apart in a direction lengthwise of the table, said stops being supported to remain stationary while the table and work thereon are moved toward the saws, the supports for said limit stops being adapted to effect oscillatory movement of the stops in a direction transversely of the path of movement of the table, resilient means normally urging oscillation of the stops toward the table, and foot treadle means operatively coupled with the stops for effecting the oscillation of the same in opposition to said resilient means.

PAUL L. BLUM.

References Cited in the file of this patent
UNITED STATES PATENTS

| Number | Name | Date |
|---|---|---|
| 75,021 | Hutchinson | Mar. 3, 1868 |
| 239,730 | Chittenden | Apr. 5, 1881 |
| 360,616 | Philbrick | Apr. 5, 1887 |
| 405,148 | Dallas | June 11, 1889 |
| 415,558 | Pleukharp | Nov. 19, 1889 |
| 509,534 | Hayne | Nov. 28, 1893 |
| 664,530 | Brown | Dec. 25, 1900 |
| 689,026 | Rust | Dec. 17, 1901 |
| 698,006 | Gerrish | Apr. 22, 1902 |
| 764,612 | Moore | July 12, 1904 |
| 815,028 | Morris | Mar. 13, 1906 |
| 883,912 | Pike | Apr. 7, 1908 |
| 974,518 | Rayman | Nov. 1, 1910 |
| 1,025,048 | Bratt | Apr. 30, 1912 |
| 1,229,307 | Minor | June 12, 1917 |
| 1,322,528 | Brokaw et al. | Nov. 25, 1919 |
| 1,337,485 | Ruoff | Apr. 20, 1920 |
| 1,563,388 | Mattison et al. | Dec. 1, 1925 |
| 1,735,773 | McIlvanie | Nov. 12, 1929 |
| 2,353,134 | Anderson | July 11, 1944 |
| 2,382,208 | Corbin | Aug. 14, 1945 |